(12) United States Patent
Azih

(10) Patent No.: US 9,756,477 B2
(45) Date of Patent: *Sep. 5, 2017

(54) DEVICE, METHODS, AND SYSTEMS FOR PROXIMITY LOCALIZATION USING BEACON SWITCHES

(71) Applicant: Emmanuel Azih, Washington, DC (US)

(72) Inventor: Emmanuel Azih, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,719

(22) Filed: Jun. 10, 2015

(65) Prior Publication Data

US 2016/0119759 A1    Apr. 28, 2016

Related U.S. Application Data

(60) Provisional application No. 62/068,660, filed on Oct. 25, 2014.

(51) Int. Cl.
H04W 4/04     (2009.01)
H04W 4/00     (2009.01)
G01S 5/02     (2010.01)

(52) U.S. Cl.
CPC ............. *H04W 4/04* (2013.01); *H04W 4/008* (2013.01); *G01S 5/0289* (2013.01)

(58) Field of Classification Search
CPC .............. G08B 21/023; G08B 21/0261; G08B 21/0277; G08B 25/004; G01S 5/0009; G01S 1/68; G08C 17/02; G08C 2201/92; G08C 2201/93
See application file for complete search history.

(56) References Cited

U.S. PATENT DOCUMENTS

| | | | |
|---|---|---|---|
| 2,934,590 A | 4/1960 | Thompson et al. | |
| 7,273,983 B1 | 9/2007 | Rintz | |
| 7,528,716 B2 * | 5/2009 | Jackson | G01S 5/02 340/12.32 |
| 8,396,485 B2 | 3/2013 | Grainger et al. | |
| 8,621,097 B2 | 12/2013 | Venkatakrishnan et al. | |
| 9,037,161 B1 | 5/2015 | Azih | |
| 9,244,146 B2 * | 1/2016 | Rowitch | G01S 1/02 |
| 2005/0186965 A1 * | 8/2005 | Pagonis | G01S 5/0072 455/456.1 |
| 2012/0040663 A1 * | 2/2012 | Kamdar | H04W 16/18 455/425 |
| 2012/0258669 A1 | 10/2012 | Honkanen et al. | |
| 2013/0091520 A1 * | 4/2013 | Chen | H04N 21/25891 725/34 |
| 2013/0099920 A1 * | 4/2013 | Song | G08B 21/023 340/539.13 |
| 2014/0094936 A1 | 4/2014 | Saunders | |
| 2014/0266639 A1 * | 9/2014 | Zises | G08C 17/02 340/12.28 |
| 2014/0351180 A1 * | 11/2014 | Canoy | G06N 99/005 706/12 |
| 2015/0310712 A1 * | 10/2015 | Lyman | G08B 13/19695 348/14.01 |

* cited by examiner

*Primary Examiner* — Nizar Sivji
(74) *Attorney, Agent, or Firm* — Emmanuel Azih

(57) ABSTRACT

The present disclosure is directed to an electronic device that transmits radio signals for indoor proximity localization and digital content delivery. In one embodiment, the device may be installed in a standard electrical wall switch and powered by an AC power source.

10 Claims, 7 Drawing Sheets

300

NOTE: Setting the BEACON INTERVAL and/or the TX POWER to a value of zero (0) will tell the beacon to turn off broadcasting.

UUID uuid

MAJOR major numeric field

MINOR minor numeric field

BEACON INTERVAL (ms)

200 duration of each beacon broadcast, numeric field

TX POWER (dB)

-30 transmit power for this broadcast, numeric field, negative integer.

RSSI @ 1M

-69

CONNECTION INTERVAL (minutes)

5 number of minutes between beacon check-ins, numeric field

CONNECTION TIMEOUT (minutes)

25 number of minutes to wait for check-in before the "beacon down" email is sent, numeric field. Recommend value = 5 x Connection-Interval.

Description

John's Pizza - Bar Area

Save Options

FIG. 5

DEVICE, METHODS, AND SYSTEMS FOR PROXIMITY LOCALIZATION USING BEACON SWITCHES

CROSS-REFERENCE TO RELATED APPLICATIONS(S)

This Application claims benefit from U.S. Provisional Patent Application No. 62/068,660 filed on Oct. 25, 2014 and that is incorporated herein by reference in its entirety.

TECHNICAL FIELD

The present disclosure generally relates to an electronic device and more particularly, to an electronic switch adapted to broadcast radio signals for proximity localization services.

BACKGROUND OF THE DISCLOSURE

Determining the exact location of a device or person has increasingly become important to drive location based systems and services. Several technologies for doing so have resulted from efforts aimed at determining a person's location. For example, satellite-based global positions systems (GPS) provide location based services, provided the person with the device (i.e., receiver) is outdoors. While most of these technologies work well outdoors, they are inaccurate, indoors.

In particular, GPS systems do not work well indoors. In these systems, satellites broadcast signals to enable GPS receivers (i.e., smartphones, mobile devices, etc.) on or near the Earth's surface to determine location and synchronized time. Several factors, however, damage the GPS signal and thus affect accuracy.

For example, signal degradation occurs when the GPS signal is reflected off objects such as tall buildings or large rock surfaces before it reaches the receiver. This increases the travel time of the signal, thereby causing errors.

In addition, buildings, terrain, electronic interference, or sometimes even dense foliage can block signal reception, causing position errors or possibly no position reading at all. Thus, GPS units typically will not work indoors, underwater or underground. Accordingly, there is a need for improved techniques to determine the location of a device or person where standard GPS fails indoors.

DISCLOSURE SUMMARY

The present disclosure addresses the need in the art for such knowledge. Current technologies that attempt to determine the location of a user indoors use devices called beacons.

For example, by associating a beacon transmitter to a particular location, one may determine the location of a receiver indoors based on the receiver's proximity to the beacon.

The beacon works by using Bluetooth Low Energy (BLE). BLE communication consists of two main parts: broadcasting and connecting.

Broadcasting is a one-way mechanism. Using broadcasting, signal-broadcasting devices or beacons broadcast data to any receiver which may be in listening range, for example, a smart phone in close proximity to the beacon. Devices that broadcast BLE signals, using only the advertising channel, are customarily called beacons. Accordingly, the disclosed indoor localization wall switch represents an improved beacon.

Traditional beacons are unreliable and difficult to maintain because they are battery operated, requiring frequent battery replacement. Indeed, a scenario in which a large retail organization deploys 1000 beacons across several parts of a building would result in the inevitable inconvenience of having to replace each battery that eventually dies.

In addition current battery-powered beacons lack Wi-Fi due the heavy battery-consumption requirements for Wi-Fi radios. Therefore, these battery-powered beacons cannot be remotely managed, as they are not connected to a global network. Consequently, to change the configurable settings of the beacon (e.g., broadcast range, interval UUID, etc.), one must be in very close proximity to the beacon to establish a pairing connection. This again represents a challenge in large beacon deployments.

Even further, current beacons are housed in battery-powered dongles, and/or glued to open surfaces, so they often detract from the physical décor of each installation site and are particularly susceptible to theft and tamper.

Moreover, the installation location of the beacon is particularly relevant to localization accuracy. For example, given the intrinsic nature of BLE signal propagation and interference, installing beacons closer to the floor than ceiling within a building could reduce the efficacy of the BLE signals. The disclosed embodiments here are directed to overcoming one or more of the problems set forth above.

In a light or wall switch device embodying principles of the present disclosure, the switch comprises a transceiver operative to receive a configuration file for assigning an indoor physical location to the switch, and to transmit a one-way broadcast based on the received configuration file. The configuration file may include at least one of a broadcast interval and transmission strength of a radio signal. The configuration file may further include at least one of a URL, UUID, Major, and Minor of the radio signal.

Some embodiments of the present disclosure provide methods for delivering digital content to a receiver, comprising, receiving a plurality of one-way signals from an electrical device; wherein the radio signals are based on a received configuration file; estimating a distance between the receiver and the electrical device; and delivering content to the receiver based on the estimated distance.

The delivered content may be an image, text, audio, push notification or video. The electrical device may be enclosed in a housing having a means for affixing to a standard wall switch. Or, the electrical device is enclosed in an electrical wall switch.

Some embodiments of the present disclosure provide a system for delivering digital content to a receiver. One or more electrical devices may broadcast a plurality of one-way radio signals based on one or more configuration files. A receiver may receive the plurality of one-way radio signals and display a first content on the receiver based on a first configuration file. The receiver may also display a second content on the receiver based on a second configuration file. The electrical devices may be enclosed in a housing having a means for affixing to a standard wall switch. Or the devices may be enclosed in an electrical wall switch.

The configuration files may include at least one of a broadcast interval and transmission strength of a radio signal. The configuration files may further include at least one of a URL, UUID, Major, and Minor of the radio signal.

Additional objects and advantages of the present disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the disclosure and together with the description, serve to explain the principles, set forth.

BRIEF DESCRIPTION OF THE DRAWINGS

In order to describe the manner in which the above recited and other advantages and features of the disclosure can be obtained, a more particular description of the principles briefly described above will be rendered by reference to specific embodiments, which are illustrated in the appended drawings.

Understanding that these drawings depict only exemplary embodiments of the disclosure and are not therefore to be considered to be limiting of its scope, the principles herein are described and explained with additional specificity and detail through the use of the accompanying drawings in which:

FIG. 5 is an example screenshot of the configuration information for a light switch, consistent with disclosed embodiments.

DESCRIPTION OF THE EMBODIMENTS

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure provides an electrical device in the form of an electrical light switch that may be mounted in a standard wall orifice and configured to broadcast radio signals. In one embodiment, such signals may be Wi-Fi or Bluetooth Low Energy signals and used to determine the proximity of another device, receiver, or of a person relative to the broadcasting device itself. Based on this proximity information and other digital content may be displayed or delivered to the receiver.

Here, the electrical device encompasses an electrical wall switch, including customarily installed in a wall using, for example, standard switch and switch boxes and/or standard wall plates. In one embodiment, the wall switch is installed above the intended audience to avoid wireless barriers or interference and provide a clearer signal path.

The term Wi-Fi encompasses any type of 802.11 network, whether 802.11b, 802.11a, 802.11n, etc. Bluetooth Low Energy (BLE) encompasses standards introduced as part of the Bluetooth 4.0 broadcast specification as a wireless personal area network technology designed and marketed by the Bluetooth Special Interest Group. Thus, the term Wi-Fi and BLE is further intended to encompass future versions and/or variations of foregoing communication standards (e.g., Bluetooth 4.1, 4.2, LTE Direct, etc.).

Figure 1:
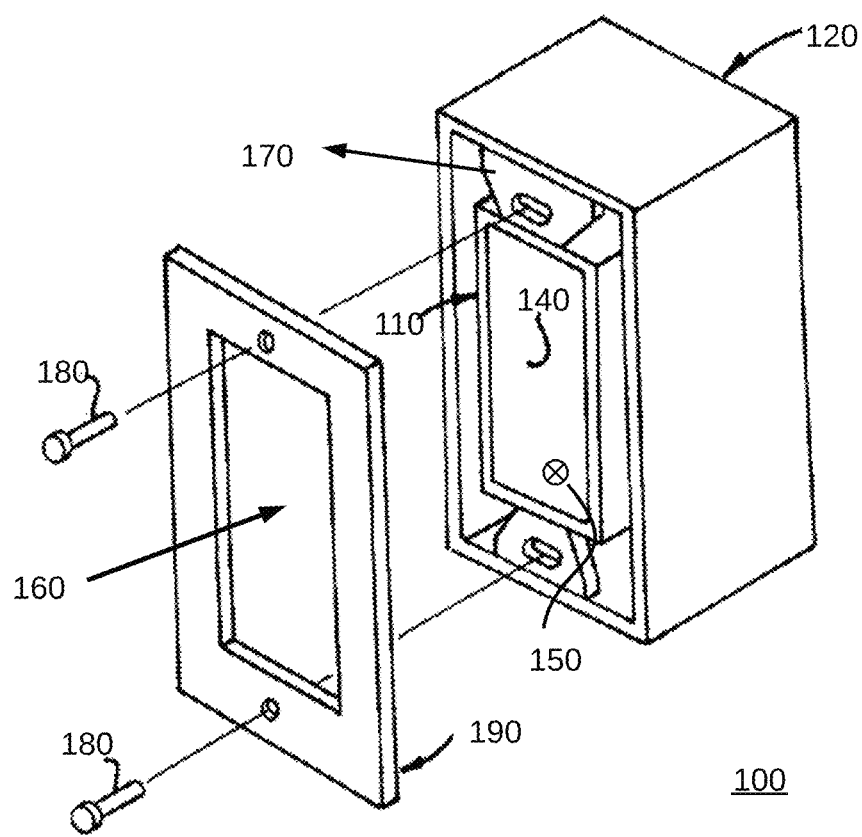
FIG. 1 illustrates a perspective view of an indoor localization wall switch according to disclosed embodiments.

FIG. 1 is a perspective view of an indoor/proximity localization switch assembly housed within a wall enclosure. Indoor localization switch assembly 100 may broadcast packets of data in regular intervals. In one embodiment, the broadcast packets may include BLE signal payloads according to a specified format. This signal may be heard or detected by any receiver (e.g., mobile device or another electronic device), triggering a certain action or event on the receiver.

Specifically, receivers that are within range of switch assembly 100 may be able to 'hear' the broadcast signal and thus estimate their location (indoor or otherwise) very precisely, as well as exchange data with switch assembly 100. For example, based on a detected signal from assembly 100, a receiver may display digital content on any Graphical Interface based on a calculated proximity to the switch assembly 100. The Graphical Interface need not be necessary attached or affixed to the receiver.

As shown in FIG. 1, switch assembly 100 may be assembled as part of a modified wall fixture, light switch, or wall switch receptacle, such as a standard home or commercial AC switch for mounting on a wall.

In one embodiment, switch 110 may have an operational indicator 150 mounted to faceplate 190 or on protruding switch portion 140 of the switch 110. Protruding switch portion 140 may be a conventional rocker type switch and alternately may be a conventional "toggle" switch 140, and/or a tactile or pressure sensitive or dome type switch. In one embodiment, switch 110 may be include multiple "poles" and "throws" as the number of discreet circuits, which are controllable by switch 110. For example, switch 110 may be a "2-pole" switch has two separate identical sets of contacts controlled by the same knob. The number of "throws" is the number of separate positions that the switch can adopt. A single-throw switch has one pair of contacts that can either be closed or open. A double-throw switch has a contact which can be connected to one of three other contacts, etc.

Faceplate 190 may be mounted atop switch receptacle 120. Faceplate 190 may have an opening 160 for switch 140 or for an operation indicator, or both.

Operational indicator 150 may be a Light Emitting Diode or standard light bulb used to visually indicate the operational status of switch 110. For example, by flashing different colors of lights or the same color of a light in a predetermined pattern, the operational indicator may alert a user of a faulty wiring, communication error, or general operating mode of switch 110. Thus, a tester circuit (not shown) for detecting a wiring reversal and other installation/configuration errors may be embodied within switch 110.

Other placements of an operational indicator and specific types of indicators, (e.g., LEDs, bulbs, sounds, etc.) or components and circuits, supporting those indicators may be devised by a person skilled in the art.

Figure 2:
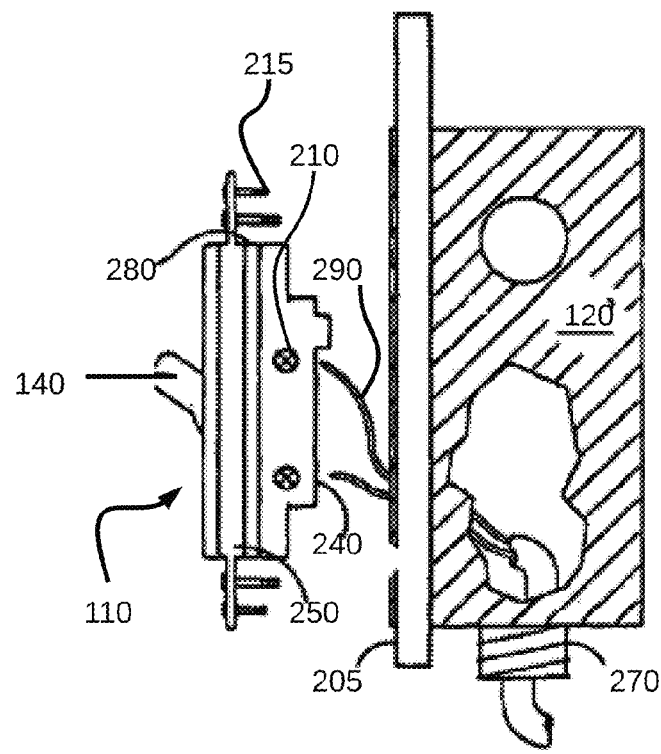
FIG. 2 shows an exploded view of the indoor localization light switch of FIG. 1.

FIG. 2 shows a cross-sectional view of indoor localization switch 110 of FIG. 1, further illustrating internal components.

A wall 205, in one embodiment, may include an embedded switch receptacle box 120 for housing electrical conducting wires 290 to be affixed to connecting hooks 210 of switch 110.

Switch receptacle box 120, may be a double switch or duplex or may have a single or other number of switches.

Switch 110 may include outer flanges 250 at a top and bottom end of switch 110. Flanges 250 may include an aperture for receipt of mounting screws 215 which may attach switch 110 to switch receptacle 120. To assemble light switch cover 15, mounting screws 105 may be inserted in their respective apertures 110 and corresponding conventional screw passageways.

Several procedures for mounting switch 110 in the receptacle structures 120 are well known in the art. Indeed various types of fasteners 170 and terminal screws 215 may be used without departing from disclosed embodiments. In one exemplarily embodiment, earth ground, neutral, or line wires 290 from standard household AC wiring may be connected to both switch connectors 210 from which embedded circuit board 280 may get its power. In such manner, AC power may be supplied directly from the household wirings 290 through circuit board 280 and to switch 140.

Circuit board 280 may be enclosed in a housing 240 of switch 110. In another embodiment, circuit board 280 may be affixed to faceplate 190. Circuit board 280 may have circuit traces for mounting electronic modules and components (not shown), including sensor modules, power modules, antenna modules, Wi-Fi modules, etc. Circuit board 280 may also include multiple circuit boards, sub boards, circuitry and components known in the art to broadcast radio signals and communicate with external devices.

For regulatory reasons, certification bodies (e.g., FCC, UL, etc.) may demand specific mounting requirements of receptacle 140 or circuit board 280; yet, such requirements still fall within the spirit of the present disclosure.

Figure 3:
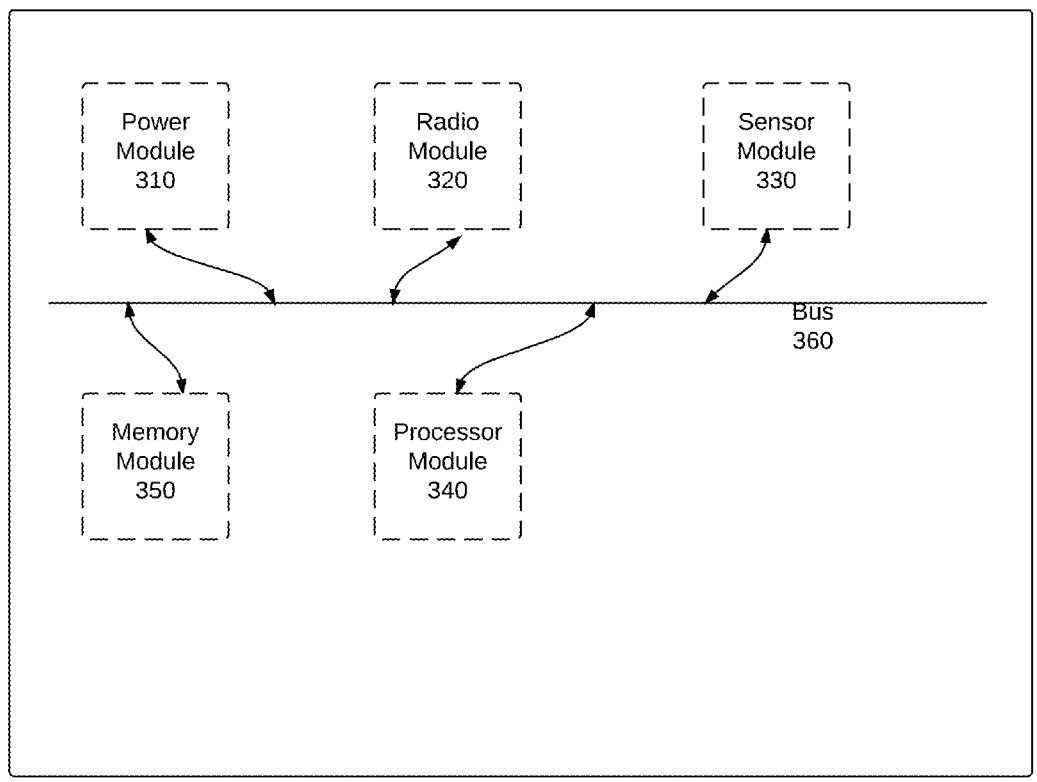
FIG. 3 illustrates a second embodiment of the indoor localization light switch according to the disclosed embodiments.

Referring now to FIG. 3, which is a block diagram illustrating an example circuit board 280 within switch 110, consistent with disclosed embodiments. Switch 110 may include circuitry for a power module 310, a radio transceiver module 320, a sensor module 330, a processor module 340, a memory module 350, and a system bus 360 that couples various system modules to each other.

Power module 310 may include circuitry for converting 120V-60 Hz AC, as commonly used in household and business AC wiring to ~5V DC, and supply the DC voltage and current to circuit board 280. Other voltage and power conversions (e.g., 240V solar power to DC), regulation, or generation circuits may be devised by a person of skill in art and the DC voltage supplied to circuit board 280 may vary within standard tolerance limits.

In one embodiment, power module 310 suitable for the powering of circuit board 280 may include a rectifier for rectifying AC voltage to DC voltage as rectified AC voltage, and a regulator for producing a regulated DC voltage from the rectified AC voltage.

Power module 310 may also include smoothing circuitry that reduces the ripple of the rectified AC voltage. The regulator section may regulate the DC voltage from the rectified AC voltage down to a lower DC voltage in a manner known in the art, such as by smoothing and dropping the DC voltage, using a DC to DC voltage conversion or a switching regulator employing a transformer and pulse logic controlled by feedback.

Power module 310 may make use of a transformer to step down the AC voltage to a lower AC voltage at a higher current, followed by rectification and regulation. Power module 310 may rectify the AC voltage directly from the AC connection, followed by rectification and regulation. A transformer may be used to transform the AC voltage or to transform a pulsed DC voltage, as in a switching regulator.

Radio module 320, may be capable of Wi-Fi, Bluetooth, or other wireless or wired bidirectional communication, including short-range or long-range wireless protocols. In one embodiment, module 320 may be a configured to receive and process data from external devices such as a portable computing device (i.e., smartphone), another switch 110, or a remote server and/or network. In one embodiment, radio module 320 may be operative to function as a router and access point, enabling Wi-Fi or BLE access to and from receivers 610 that establish a valid connection to switch 110.

In one embodiment, a plurality of switches 110 may connect to the AC wiring of a building to communicate data to/from each other or to/from a computing device such as a personal computer, mobile device, or remote server.

In a further embodiment, switch 110 may broadcast data via radio module 320 through the AC wires of the household wiring. That is, circuit board 280 may include circuits for radio module 320 configured to communicate signals and data. In order to communicate data over AC wiring, various means may be devised. For example, a data stream may be capacitively coupled to the AC wires at the first switch device and modulated over the AC wires, then a capacitively decoupled from the AC wires at the second switch device using suitable coupling and modulation/demodulation circuitry.

The modulation and demodulation may be at the applicable data rates, or may involve up conversion to a higher frequency and down conversion from the higher frequency to the data rate. Suitable filtering to remove the AC line frequency e.g. 60 Hz at the receiving end may be applied, along with data recovery circuitry.

Data or a data stream may be embedded in or include a clock signal, and the clock signal may be recovered at the receiving end by suitable clock recovery circuitry.

Data may be sent directly in a modulated format resembling or related to industry standards albeit at appropriate voltage levels for AC line modulation, or the data may be accompanied by additional network-related packet information or other data so that the AC lines are used as a network.

Collision protocols or circuitry may be included for more reliable communication. Communication may be point to point or have a limited number of specified addresses, or may be generally networked, with appropriate protocols and circuitry included in switch 110. Communication maybe unidirectional or bidirectional, and may be simplex, half duplex or full-duplex, make use of time division multiplexing or other multiplexing schemes or known aspects of communication technology.

In addition, other connectors, standards, signals, data, circuitry and ports may be applied and included in the switch 110 as according to several embodiments. Indeed, additional data from sensors such as temperature, sound, motion, accelerometers may be communicated among and between switches 110, peripherals, and computing devices over AC wiring, Wi-Fi, or standard Bluetooth communication protocols.

Sensor module 330 may include circuitry for modules capable of various senses including motion, sound, light, temperate, and/or acceleration. Other sensors may be devised by a person of skill in art and coupled to switch 110.

Processor module 340 may include may include circuitry for modules configured to general-purpose processors including hardware or software modules configured to control other modules on circuit board 280 as well as a special-purpose processor where software instructions are incorporated into the actual processor design.

Processor module 340 may essentially be a completely self-contained computing system, containing multiple cores or processors, a bus, memory controller, cache, etc. A multi-core processor may be symmetric or asymmetric.

These and other modules can control or be configured to control or support processor 340 to perform various actions. For example, circuitry for memory module 350 may be available for use as well. Memory module 350 may be multiple different types of memory with different performance characteristics.

The present disclosure may operate on a circuit board 208 with more than one module or on a group or cluster of external computing devices networked together (e.g., System on a Chip) to provide greater processing capability.

System bus 360 may be any of several types of bus structures including a memory bus or memory controller, a peripheral bus, and a local bus using any of a variety of bus architectures. A basic input/output (BIOS) stored in memory 350 or the like, may provide the basic routine that helps to transfer information between modules on the circuit board 280.

Hardware modules of the present disclosure that perform a particular function may include the software component stored in a non-transitory computer-readable medium in connection with the necessary hardware components, such as processor 340, power module 310, bus 360, radio module 320 or sensor module 330.

Figure 4:
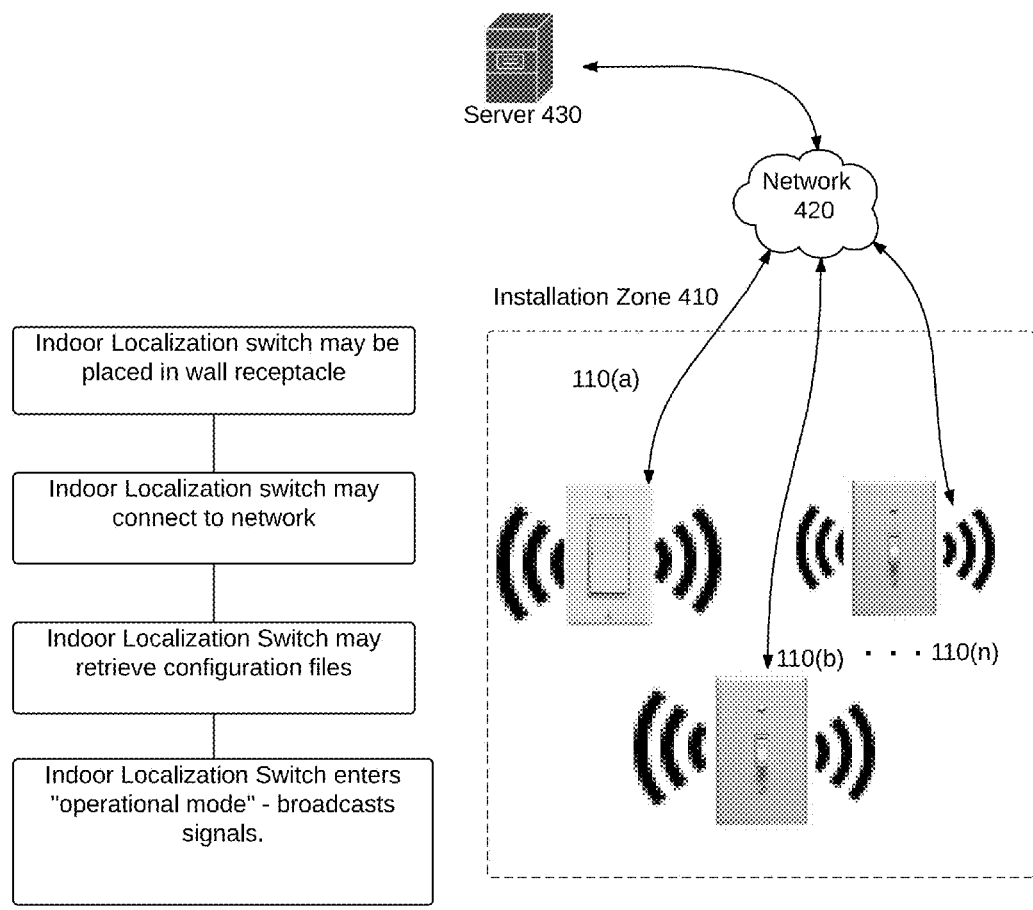
FIG. 4 is a block diagram illustrating an example circuit board for a light switch, consistent with disclosed embodiments.

A plurality of switches 110 as illustrated in FIG. 4 could be retrofitted or installed in installation zone 410. Upon installation, switch 110 may connect to network 410 to retrieve its configuration information (Step 3). In one embodiment, switch 110 may calibrate the RSSI of the indoor localization switch because a receiver may calculate distance to switch 110 based on the ratio of switch's 110 broadcast signal strength (RSSI) over a calibrated transmitter power. Thus, the transmitted power may illustrate the known measured signal strength in RSSI at a specific meter away (e.g., 1 meter). Each switch may be calibrated with a transmitted power value to allow accurate distance estimates. In one embodiment, such configuration information may be pre-loaded into indoor localization switch 110 before or during installation.

Switch 110 may connect to server 430 via network 420 on predetermined intervals to download updated configuration information/files or to provide other information (e.g., status). In one embodiment light switch 100 may retrieve its configuration information via mobile electronic device operative to communicate with switch 110 via Bluetooth or Wi-Fi.

Network 420 may enable communication between several light switches 110 (e.g., 110(*a*), 110(*b*) . . . 110(*n*)), and server 430. Network 420 includes a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Bluetooth, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data and/or radio signal.

Although network 420 is depicted as a single network, it should be appreciated that according to one or more embodiments, network 420 may comprise a plurality of interconnected networks, such as, for example, the Internet, a service provider's network, a cable television network, corporate networks, and home networks.

Moreover, several indoor localization switches 110*a*-110*n* may be deployed across several installation sites 410 and may be similarly associated with a physical location within each building.

FIG. 5 is an example screenshot of configuration file or configuration information of indoor localization wall switch 110, consistent with disclosed embodiments. As illustrated, the configuration information may include several contextual tags including, for example, a standard BLE values such as a Universal Unique Identifier (UUID), a first identifier, a second identifier, or received signal strength indicator (RSSI).

In one embodiment, the UUID may be used uniquely identify one or more indoor localization switches 110 as a certain type or from a certain organization or of a physical location. The first ID may be a Major value that may be used to group indoor localization switches 110 having the same UUID. The second ID may be a Minor value to differentiate indoor localization switches 110 with the same UUID and Major value.

Figure 6:
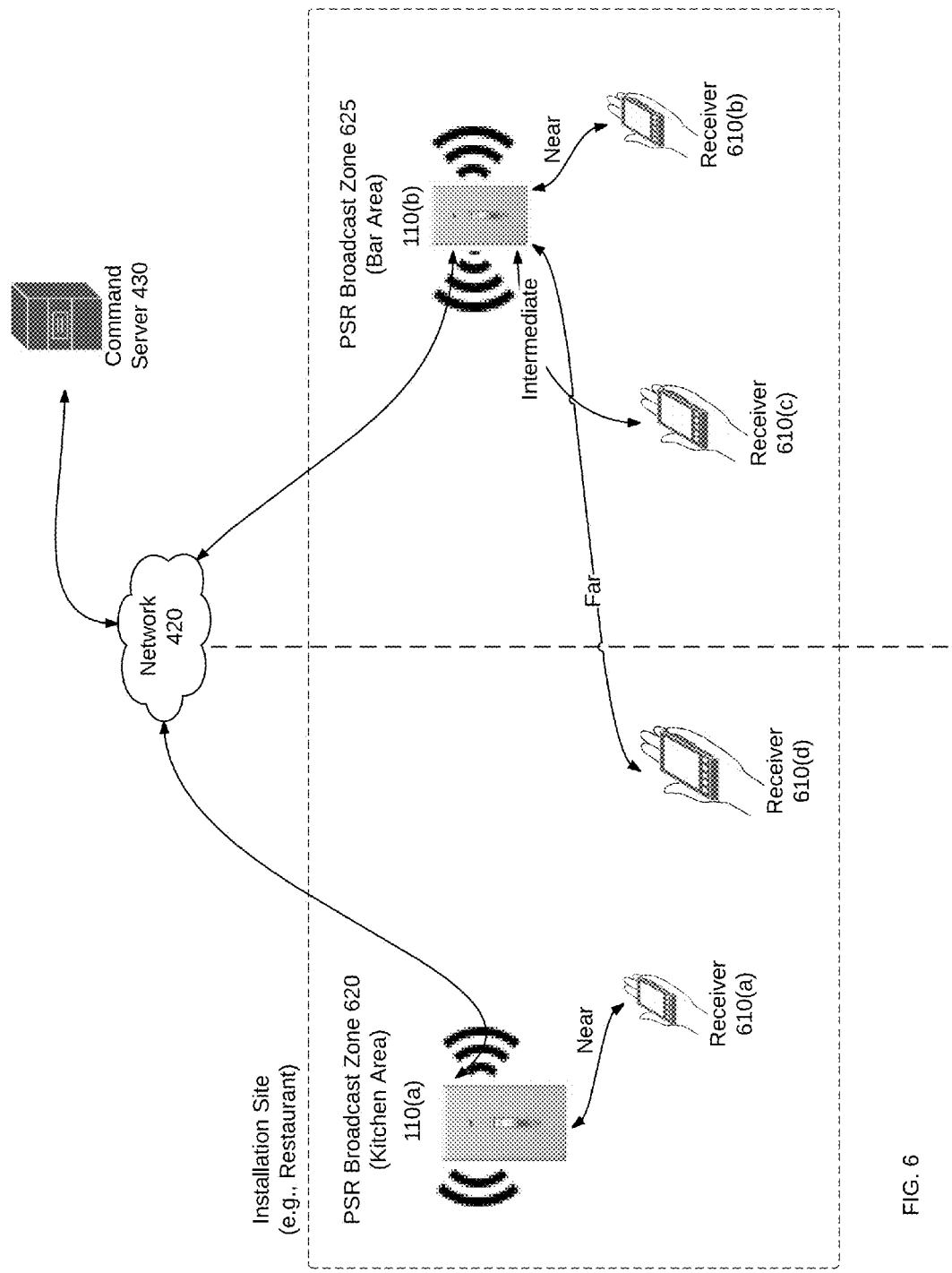
FIG. 6 is a diagram illustrating an exemplary implementation method of an indoor localization light switch, consistent with disclosed embodiments.

As noted above, the RSSI transmission value may be programmed into each indoor localization switch 110 to facilitate determining the distance from the switch based on the signal strength of the broadcast signal upon receiver 710 as illustrated in FIG. 6.

It should be appreciated that according to one or more embodiments, UUID, first ID, and second ID being broadcast by switch 110 may be represented by any combination of alphanumeric characters including, for example, a Uniform Resource Locator (URL), and is used to specify addresses on the World Wide Web.

For example, in a restaurant setting, the UUID of a signal-broadcasting device may be assigned to a particular restaurant (e.g., John's Pizza), and major value may be assigned to a group (e.g., John's Pizza on 4th Street) and minor values may be used to group or distinguish multiple signal-broadcasting devices within John's Pizza on 4th street. For example, the minor value may be assigned to a micro location within the restaurant (e.g., bar area). In this manner, several combinations/permutations of UUIDS, major, and minor values may be assigned to any physical location.

Figure 7:
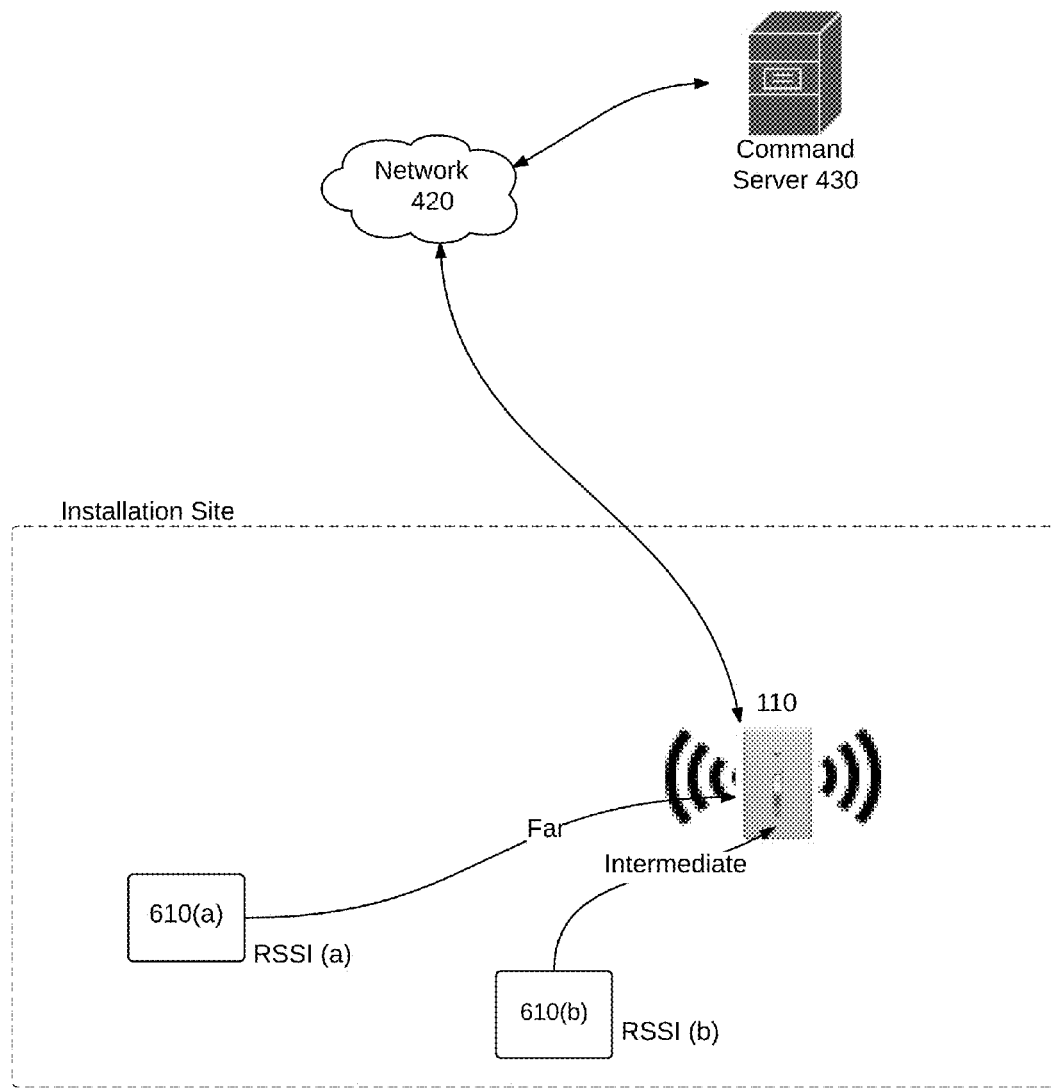
FIG. 7 is a diagram illustrating an exemplary implementation method of an indoor localization light switch, consistent with disclosed embodiments.

If multiple indoor localization switches 110 are deployed, each associated with a particular entity and/or a micro location, a computing device such as a smartphone 610 may determine its location with respect to each device based on one or more signal strengths being broadcast as illustrated in FIG. 7.

Referring to FIG. 6, indoor localization switches 100(a) and 100(b) may be configured to receive and process communications from a plurality of receivers, e.g., 610(a), 610(b), and 610(c). Receivers 610 may be any device capable of detecting signals being broadcast from indoor localization switch 110. Such receivers may include personal computers, laptops, mobile phones, wearable tags for humans and pets (trackers). The range or broadcast transmit power of each switch 100 may be set to cover a predetermined physical radius such that receivers 610 may selectively detect a particular signal from a switch 110. In one embodiment, the range/radius may be set in the configuration information file of each switch 110 or modified via network 420.

In a further embodiment, the broadcast zone or radius of switch 110(a) may be configured to be limited to the dimension of a kitchen area 620. Whereas broadcast zone of 100(b) may be configured to be limited to the bar area 625. In this manner, receivers 610 may accurately determine indoor proximity or location based on the relative signal strength of the signals being broadcast by switch 100(a) and 100(b). Thus, an event such as a push notification, video, text, vibration event handle, or audio may be triggered on the receiver 610 based on its proximity or relative proximity (e.g., near, intermediate, or far) to either device 110(a) or 110(b).

For example, if a mobile device 610 is closet to a switch 110 assigned to the entrance of an installation site (e.g., Restaurant), receiver 610(d) may display coupon notification. As the customer enters into restaurant and is thus closer to switch 100(b), receiver 610(c) may trigger an additional display of the bar's drink menu based on the user's proximity to that switch. In this manner, different experiences may be realized on receiver 610 based on the relative proximity and location of the receiver to switches 110. As previously noted receiver 610 may be a smartphone or any other device with or without a graphical user interface or graphical display unit.

In another embodiment, receiver 610 may connect to an external database to transmit or receive information within or external to the actual broadcast zone. For example, when receiver 610 detects switch 110, it may connect to a server database 430 via network 420 to associate the received UUID, Major, or Minor to a physical location. Receiver may also retrieve additional Meta or contextual data regarding the detected switch 110 or retrieved location. The meta-data, for example, could include the name, address, floor number, or description of the location in which the switch is installed. Using this contextual information, receiver 610 may also trigger additional relevant notifications.

In another embodiment, receiver 610 may connect as a client to to Wi-Fi access points of switch 110 as a gateway to connect to external server 430 in cases where cell tower service is unavailable. In other words, receiver 610 may communicate external messages to server 430 either by connecting directly via network 420 or indirectly via access points of switch 110.

The figures illustrate various components (e.g., servers, receivers, processors, etc.) separately. The functions described as being performed at various components may be performed by other components, and the various components or modules may be combined or separated.

Having identified and described various embodiments, aspects and features associated with the signal-broadcasting device of the present disclosure, it is specially noted that each of the disclosed devices may be configured and dimensioned so as to be operatively associated with either an existing standard wall switch box (e.g., retro construction) or a new wall swtich box (e.g., new construction).

It is noted that in other aspects of the present disclosure, the device may be accommodated by a housing such as disclosed herein or structures of similar construction. Alternative retrofitting techniques may be employed without departing from the spirit or scope of the present disclosure, as will be readily apparent to persons skilled in the art.

Each of the signal-broadcasting devices may incorporate additional structural features and/or functions. For example, ventilation openings may be incorporated into the design of the disclosed devices/systems, to facilitate heat dissipation. The amount of heat generated by the disclosed signal broadcasting devices may vary (e.g., based on the components associated with the disclosed device/system).

Moreover, one may appreciate several placement options of the signal-broadcasting device to achieve maximum radio frequency broadcasting without parting from the spirit and scope of the present disclosure.

Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A light switch device, comprising:
    a housing including a top outermost surface and a bottom outermost surface;
    a fastener at the top outermost surface or the bottom outermost surface, wherein the fastener includes an aperture for receipt of a fastening component to secure the switch to a wall receptacle;
    receiver circuitry contained in the housing and configured to receive a configuration file from a remote server, the configuration file including at least one of a first radio signal identifier or a second radio signal identifier, wherein the first radio signal identifier is indicative of a first location, and the second radio signal identifier is indicative of a second location within the first location; and
    transmitter circuitry contained in the housing and configured to broadcast to an external device at least one of the first radio signal identifier and the second radio signal identifier based on at least one of a broadcast interval and transmission strength of the first radio signal identifier defined by the received configuration file.

2. The device of claim 1, wherein the configuration file further includes a third radio signal identifier or fourth radio signal identifier, wherein the third identifier is indicative of a third location and the fourth identifier is indicative of a fourth location within the third location.

3. The device of claim 1, wherein the radio signal represents a one-way Bluetooth Low Energy signal.

4. The device of claim 1, wherein the first identifier is at least one of a URL or UUID.

5. The device of claim 1, wherein the second radio signal identifier is at least one of a URL or UUID.

6. A method for broadcasting location zones using a light switch, comprising:
    securing the light switch to a wall receptacle with a fastener at the top outermost surface or the bottom outermost surface of a housing of the switch;
    receiving via a receiver circuitry contained in the housing a configuration file from a remote server, the configuration file including at least one of a first radio signal identifier or a second radio signal identifier, wherein the first radio signal identifier is indicative of a first location and the second radio signal identifier is indicative of a second location within the first location; and broadcasting, to an external device, via a transmitter circuitry contained in the housing, at least one of the first radio signal identifier or a second radio signal identifier based on at least one of a broadcast interval and transmission strength of the first radio signal identifier defined by the received configuration file.

7. The method of claim 6, wherein the configuration file further includes a third radio signal identifier or fourth radio signal identifier, wherein the third identifier is indicative of a third location and the fourth identifier is indicative of a fourth location within the third location.

8. The method of claim 6, wherein the radio signal represents a one-way Bluetooth Low Energy signal.

9. The method of claim 6, wherein the first radio signal identifier is at least one of a URL or UUID.

10. The method of claim 6, wherein the second radio signal identifier is at least one of a URL or UUID.

* * * * *